(12) United States Patent
O'Brien et al.

(10) Patent No.: US 7,051,438 B2
(45) Date of Patent: May 30, 2006

(54) METHOD FOR MANUFACTURING A VEHICULAR DOOR ASSEMBLY

(75) Inventors: Timothy F. O'Brien, White Lake, MI (US); Manfred Fritsch, Highland, MI (US); Daniel E. Wenglinski, Taylor, MI (US); Russell P. Shafer, Jr., Howell, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/472,924

(22) PCT Filed: Mar. 22, 2002

(86) PCT No.: PCT/US02/08999

§ 371 (c)(1),
(2), (4) Date: Feb. 26, 2004

(87) PCT Pub. No.: WO02/076776

PCT Pub. Date: Oct. 3, 2002

(65) Prior Publication Data

US 2004/0123446 A1   Jul. 1, 2004

Related U.S. Application Data

(60) Provisional application No. 60/277,908, filed on Mar. 22, 2001.

(51) Int. Cl.
*B21D 53/88* (2006.01)
*B60J 5/00* (2006.01)

(52) U.S. Cl. ............... 29/897.2; 29/469; 296/146.7

(58) Field of Classification Search .......... 29/469, 29/401.1, 426.1, 426.2, 426.4, 897.2; 296/146.7; 49/502

See application file for complete search history.

(56) References Cited

U.S. PATENT DOCUMENTS

| 4,815,984 | A | * | 3/1989 | Sugiyama et al. ........ 439/211 |
| 4,907,836 | A | * | 3/1990 | Ueda et al. .............. 296/39.1 |
| 5,050,350 | A | | 9/1991 | Bertolini et al. |
| 5,095,659 | A | | 3/1992 | Benoit et al. |
| 5,529,370 | A | | 6/1996 | Veit |
| 5,577,794 | A | | 11/1996 | Gandhi et al. |
| 5,902,004 | A | * | 5/1999 | Waltz et al. ............ 296/146.9 |
| 5,927,020 | A | * | 7/1999 | Kobrehel ................. 49/502 |
| 6,000,949 | A | | 12/1999 | Takiguchi et al. |
| 6,139,088 | A | | 10/2000 | Okamoto et al. |
| 6,185,827 | B1 | | 2/2001 | Polites |
| 6,185,872 | B1 | * | 2/2001 | Seeberger et al. ......... 49/502 |
| 6,226,927 | B1 | | 5/2001 | Bertolini et al. |
| 6,438,899 | B1 | * | 8/2002 | Feder et al. ............. 49/502 |
| 6,449,907 | B1 | * | 9/2002 | Nishikawa et al. ......... 49/502 |

FOREIGN PATENT DOCUMENTS

DE          19827362        * 12/1999

(Continued)

*Primary Examiner*—Eric Compton
(74) *Attorney, Agent, or Firm*—Honigman, Miller, Schwartz and Cohn LLP

(57) ABSTRACT

A method for manufacturing a vehicular door assembly (10) having a door (12), a door panel (14), a substrate (54), a plurality of systems, and a plurality of components. The method includes the steps of fastening the door panel (14) to the door (12), attaching the substrate (54) to the door panel (14), and securing the plurality of components to the substrate prior to attaching the substrate to the door panel (14) such that each of the plurality of components is operational upon the substrate being attached to the door panel (14).

10 Claims, 3 Drawing Sheets

| | FOREIGN PATENT DOCUMENTS | | | JP | 09-263192 | * | 10/1997 |
|----|----|----|----|----|----|----|----|
| | | | | JP | 2001-018654 | * | 1/2001 |
| EP | 0 427 153 A2 | | 11/1990 | WO | WO 97/06024 | | 2/1997 |
| EP | 0579535 | * | 1/1994 | WO | 00/12356 | * | 3/2000 |
| EP | 1 010 557 A1 | | 6/2000 | | | | |
| JP | 07-156725 | * | 6/1995 | * cited by examiner | | | |

METHOD FOR MANUFACTURING A VEHICULAR DOOR ASSEMBLY

This application claims the benefit of Provision Application No. 60/277,908, filed Mar. 22, 2001.

BACKGROUND OF THE INVENTION

1. Field of the Invention

This invention relates to a method for manufacturing a vehicular door assembly. More particularly, the invention relates to a method for manufacturing a vehicular door assembly using parts that are grouped together to ease the assembling and disassembling thereof.

2. Description of Related Art

Motor vehicles typically include a vehicular door assembly including a door panel attached to an interior structural panel. The door panel serves a dual purpose. First, the door panel conceals the mechanical and electrical components of the door and, second, the door panel adds to an aesthetically pleasing passenger compartment. The door panel is commonly constructed of a molded rigid base portion covered by a trim cover such as cloth, vinyl, leather or a combination thereof. One or more openings may be formed in the door panel for receiving and securing various components to the vehicular door assembly. These components include a grab handle, a door lock and release lever, audio speakers and grills, and electronic window controls.

The door panel can be made available for re-manufacturing after the life of the door panel has expired. At present, however, before re-manufacturing can take place, certain components must be individually disassembled and/or removed from the door panel. This disassembly process is time-consuming and adds to the total re-manufacturing costs. As a result, there is a need for a method by which such re-manufacturing of a door panel maybe carried out more efficiently.

SUMMARY OF THE INVENTION

The invention is a method for manufacturing a vehicular door assembly having a door, a door panel, a substrate, a plurality of systems, and a plurality of components. The method includes the step of fastening the door panel to the door. The substrate is then attached to the door panel. The plurality of components are secured to the substrate prior to attaching the substrate to the door panel, such that each of the plurality of components is operational upon the substrate being attached to the door panel.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
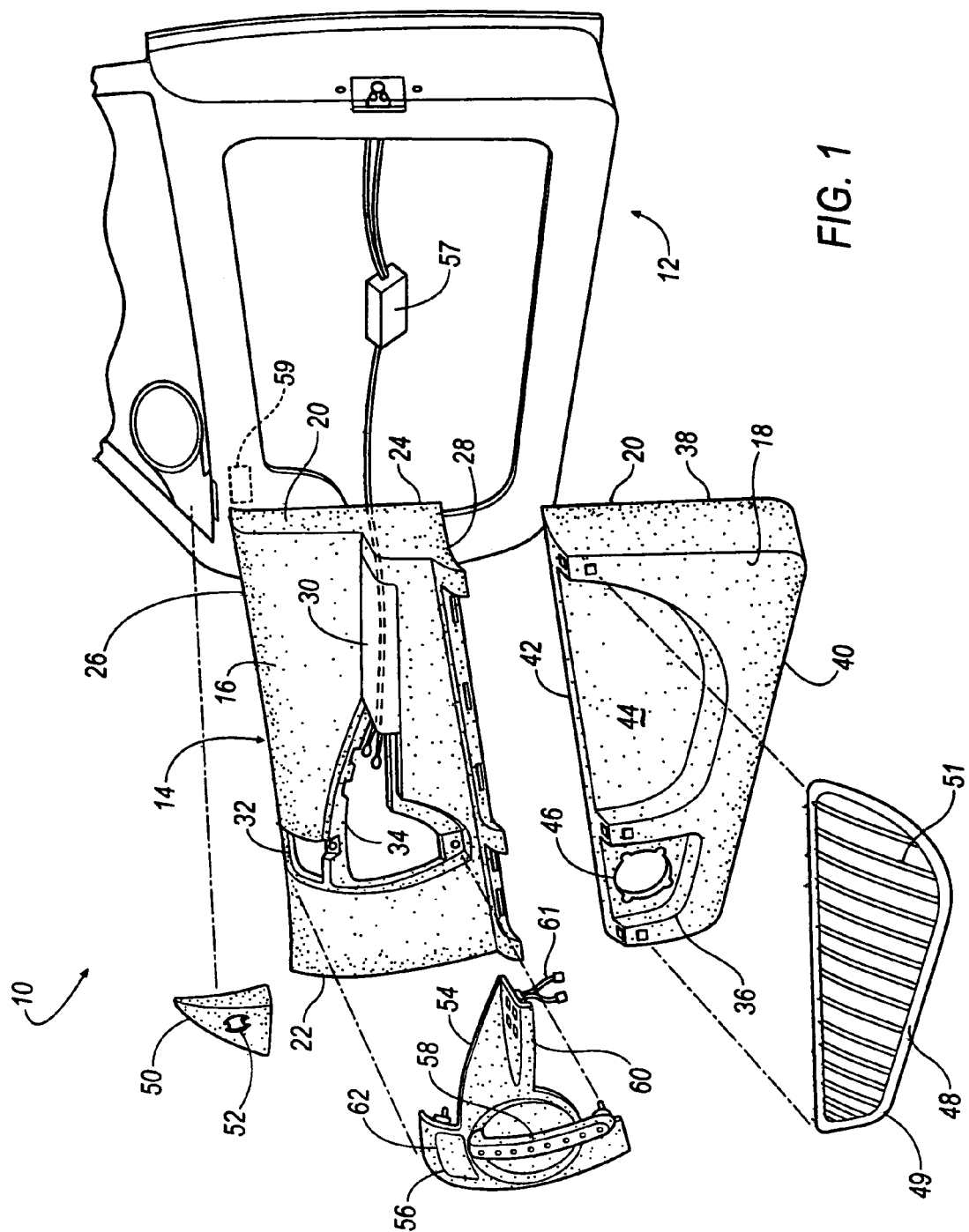
FIG. 1 is a partially exploded perspective view of a vehicular door assembly including a door panel and a substrate for attachment thereto according to the inventive method.
Figure 2:
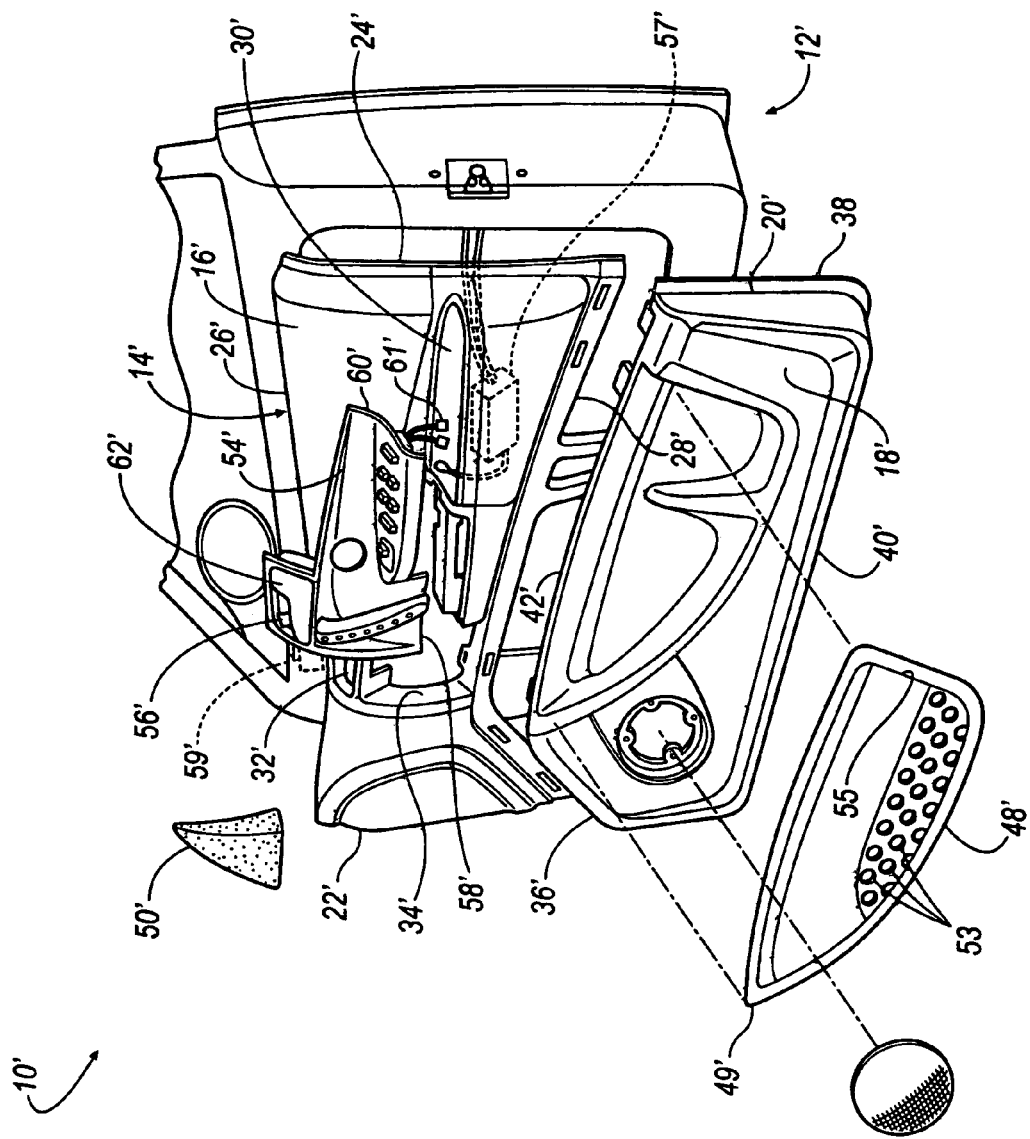
FIG. 2 is a partially exploded perspective view of an alternative vehicular door assembly having a door panel and a substrate for attachment thereto according to the inventive method.

Referring to FIGS. 1 and 2 wherein like primed numerals represent similar elements in alternative embodiments, a vehicular door assembly is generally shown at 10. The vehicular door assembly 10 includes a door 12, generally indicated at 12, and a door panel, generally indicated at 14. The door panel 14 includes a generally planar upper door panel 16 and a generally planar lower door panel 18. Both the upper 16 and lower 18 door panels may be formed from polypropylene and then covered by a trim cover 20. The trim cover 20 may be cloth, vinyl, leather, or a combination thereof. The upper door panel 16 extends longitudinally between a front edge 22 and a rear edge 24, and vertically between a top edge 26 and a bottom edge 28. The upper door panel 16 includes an integrally molded armrest portion 30 and a pair of openings 32, 34 passing therethrough. The lower door panel 18 extends longitudinally between a front edge 36 and a rear edge 38, and vertically between a bottom edge 40 and a top edge 42. The top edge 42 of the lower door panel 18 is attachable to the bottom edge 28 of the upper door panel 16 to form the door panel 14 for covering an interior structural panel (not shown) of the vehicular door assembly 10.

The lower door panel 18 includes a contoured and recessed map pocket 44, and a speaker aperture 46 for receiving and mounting an audio speaker to the vehicular door assembly 10. An accessory grill cover 48 is fixedly secured to the lower door panel 18 to enclose and cover the map pocket 44 and the speaker aperture 46. The accessory grill cover 48 includes a frame 49 formed from polyolefin or a similar thermoplastic material. Further, the accessory grill cover 48 may have a ribbing 51 extending across the frame 49, as shown in FIG. 1, or apertures 53 extending through a solid pocket 55, as shown in FIG. 2.

The vehicular door assembly 10 may also include a shark fin-shaped panel 50 fixedly secured to the upper door panel 16. The shark fin-shaped panel 50 includes an aperture 52 for receiving and mounting a secondary audio speaker, such as a tweeter speaker, thereto. The shark fin-shaped panel 50 is preferably molded polypropylene.

The vehicular door assembly 10 further includes a substrate 54. The substrate 54 may be injection molded from polypropylene in a similar fashion as the upper 16 and lower 18 door panels. The substrate 54 is shaped to fit into the openings 32, 34 formed on the upper door panel 16. Further, the substrate 54 is formed to receive a plurality of components thereto, and the plurality of components in turn actuates a plurality of systems, such as a door locking mechanism 57 or a power mirror mechanism 59, of the vehicular door assembly 10. The plurality of components typically includes, but is not limited to, a lock/handle assembly 56, a grab handle 58, and a switch plate bezel 60. The plurality of components 56, 58, 60 may also include speakers, wiring, and lighting for the vehicular door assembly 10.

Figure 3:
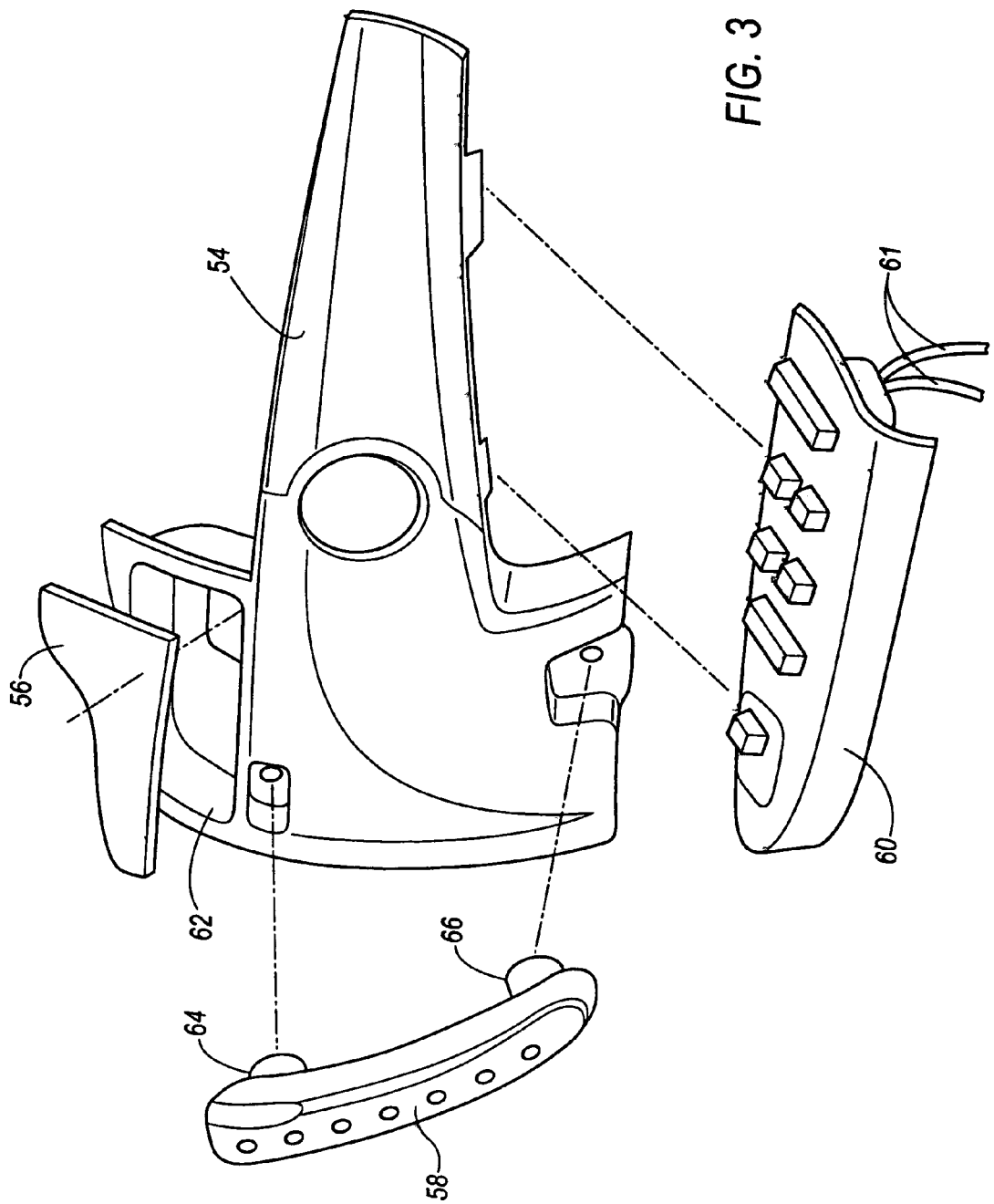
FIG. 3 is a partially exploded perspective view of the substrate and a plurality of components to be secured thereto for use during the assembly of a vehicular door assembly according to the inventive method.

Referring to FIG. 3, the substrate 54 defines a recessed cavity 62 for receiving and operably mounting a lock/handle assembly 56 for actuating the door 12, as is known to one of ordinary skill in the art. The lock/handle assembly 56 is typically a metal or plastic construction. A grab handle 58 includes opposing first 64 and second 66 ends mounted to the substrate 54 by metal screws, bolts, snaps, or similar fasteners. The grab handle 58 is preferably molded plastic. The substrate 54 also includes a switch plate bezel 60 mounted thereto. The switch plate bezel 60 includes a port, jack or a portion of the electrical wiring 61 and the switches for controlling the motion of the windows, mirrors, seats, or other vehicle elements.

Therefore, the substrate 54 integrates a plurality of components of the upper door panel 16 such that the substrate 54 and the plurality of components may be preassembled before attachment to the door panel 14. Such a combination of a plurality of components secured to a single structure for subsequent installation to a motor vehicle is also known as a modular unit, and is well known by those skilled in the art.

Since the plurality of components, or at least a portion of the plurality of components, may be attached to the substrate 54 prior to securing the substrate 54 to the door panel 14 (which has already been fastened to the door 12), the time-consuming process of securing components individually to the door panel 14 is avoided during the method for assembling the vehicular door assembly. Moreover, proper alignment of the portion of the plurality of components during attachment of the portion of the plurality of components to the substrate 54 allows the attachment of the substrate 54 to the door panel 14 to be even more efficient. At the time that re-manufacturing of the door panel 14 is desired, the substrate 54, including the plurality of components secured thereto, may be removed from the door panel 14 as a single unit. Thus, the otherwise time-consuming process of individually removing the plurality of components from the door panel 14 that is not suited for re-manufacturing is avoided. As a result, the door panel 14 is ready for use in re-manufacturing without the need for further disassembly of components therefrom.

Finally, it should be appreciated that a similar substrate having a plurality of components attached thereto may also be employed for other motor vehicle components such as instrument panels, headliners, and the like.

The method for manufacturing the vehicular door assembly 10 begins with the step of fastening the door panel 14 to the door 12. The door panel 14 is formed from polypropylene. The next step is securing the plurality of components, including but not limited to the lock handle assembly 56, the grab handle 58, and the switch plate bezel 60, to the substrate 54. The substrate 54 is formed from polypropylene, and may be formed to include the recessed cavity 62 for receiving one of the plurality of components being secured thereto. Also at this stage, that is, before attachment of the substrate 54 to the door panel 14, a portion of the plurality of components may be connected to the plurality of systems associated therewith. Finally, the substrate 54, with the plurality of components secured thereto, is attached to the door panel 14. During such attachment of the substrate 54 to the door panel 14, the portion of the plurality of components may be aligned so that each of the portion of the plurality of components can be connected to each of the plurality of systems.

Re-manufacturing of the door panel 14 is facilitated by removing the substrate 54 from the door panel 14. Because the plurality of components are fixedly secured to the substrate 54, they are also removed from the vehicular door assembly 10 in the same step of removing the substrate 54.

In another method for manufacturing the vehicular door assembly 12, the method begins with fastening the door panel 14 to the door 12. Again, the door panel 14 is formed from polypropylene. Next, the plurality of components are secured to the substrate 54 in such a fashion that when the substrate 54 is removed from the door panel 14, the plurality of components is removed therewith. At this time, the plurality of components can also be connected to the plurality of systems. Finally, the substrate 54 is attached to the door panel 14. During such attachment of the substrate 54 to the door panel 14, a portion of the plurality of components may be aligned so that the portion of the plurality of components is connected to each of the plurality of systems.

The removal of the plurality of components along with the removal of the substrate 54 allows the door panel 14 to be subsequently removed free of the plurality of components and ready for re-manufacture.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A method for manufacturing a vehicular door assembly, the method comprising the steps of:
   attaching a door panel made entirely of a polymer-based, recyclable material to an inner surface of a door to cover at least a portion of the door such that the door panel is visible to an occupant;
   securing at least one component capable of actuating at least one system of the vehicular door assembly to a substrate to form a modular unit; and
   attaching the modular unit to the door panel after said securing step such that the substrate is visible to the occupant,
   whereby the door panel is in a recyclable condition by removing the modular unit front the door panel and removing the door panel from the door without additional disassembly of the door panel.

2. A method as set forth in claim 1 including the step of connecting at least a portion of the at least one component to the at least one system associated therewith before the step of attaching the substrate to the door panel.

3. A method as set forth in claim 2 wherein the step of securing the at least one component includes the step of aligning a portion of the at least one component such that the at least one component is connected to the at least one system associated therewith during the step of attaching the substrate to the door panel.

4. A method as set forth in claim 3 including the step of forming the substrate with a recessed cavity to receive the at least one component therein.

5. A method as set forth in claim 4 including the step of forming the substrate from polypropylene.

6. A method as set forth in claim 5 including the step of forming the door panel from polypropylene.

7. A method as set forth in claim 6 including the step of removing the substrate from the door panel and removing the door panel from the door to facilitate re-manufacturing the door panel for post-consumer use.

8. A method as set forth in claim 7 including the step of removing the at least one component from the vehicular door assembly when removing the substrate from the door panel.

9. A method as set forth in claim 1 wherein the door panel includes an upper door panel and a lower door panel and further including the step of attaching the upper panel to the lower panel.

10. A method as set forth in claim 9 including the step of attaching the substrate to one of the upper and lower door panels.

* * * * *